(12) United States Patent
Reponen

(10) Patent No.: US 10,484,523 B2
(45) Date of Patent: Nov. 19, 2019

(54) MOBILE COMMUNICATION TERMINAL AND METHOD THEREFORE

(71) Applicant: Conversant Wireless Licensing S.a r.l., Luxembourg (LU)

(72) Inventor: Erika Reponen, Tampere (FI)

(73) Assignee: Conversant Wireless Licensing S.a r.l., Luxembourg (LU)

( * ) Notice: Subject to any disclaimer, the term of this patent is extended or adjusted under 35 U.S.C. 154(b) by 0 days.

(21) Appl. No.: 15/094,237

(22) Filed: Jul. 26, 2016

(65) Prior Publication Data

US 2017/0085690 A1 Mar. 23, 2017

Related U.S. Application Data

(62) Division of application No. 11/837,227, filed on Aug. 10, 2007, now abandoned.

(51) Int. Cl.
*H04M 1/22* (2006.01)
*H04M 1/725* (2006.01)
*H04M 1/02* (2006.01)

(52) U.S. Cl.
CPC ......... *H04M 1/22* (2013.01); *H04M 1/72544* (2013.01); *H04M 1/72563* (2013.01); *H04M 1/0283* (2013.01); *H04M 2250/52* (2013.01)

(58) Field of Classification Search
CPC ........ H05K 5/0243; H01H 2219/0026; H04M 1/0283; H04M 1/22; H04M 1/72563; H04M 1/72544; H04M 2250/52; H04N 1/62; H04N 1/60; G06T 11/001
See application file for complete search history.

(56) References Cited

U.S. PATENT DOCUMENTS

| | | | | |
|---|---|---|---|---|
| 5,802,361 | A  * | 9/1998 | Wang ............................ | 395/600 |
| 2003/0021468 | A1 * | 1/2003 | Jia ........................... | G06T 11/60 382/162 |
| 2005/0243101 | A1 * | 11/2005 | Sasaki ..................... | G06T 15/04 345/601 |
| 2006/0046781 | A1 * | 3/2006 | Barfoed .............. | H05K 5/0243 455/557 |
| 2007/0273624 | A1 * | 11/2007 | Geelen .................. | G01C 21/36 345/84 |

* cited by examiner

*Primary Examiner* — Dinh Nguyen
(74) *Attorney, Agent, or Firm* — Conversant Wireless Licensing

(57) ABSTRACT

The disclosed embodiments relate to a mobile communication terminal including a user interface and a processor. The mobile communication terminal receives real time acquired colour data, from which the processor generates a colour scheme for the user interface. The light generating means receive the colour scheme and provide a coloured light to user interface in accordance with the colour scheme.

12 Claims, 4 Drawing Sheets

MOBILE COMMUNICATION TERMINAL AND METHOD THEREFORE

CROSS-REFERENCE TO RELATED APPLICATIONS

This application is a divisional of U.S. patent application Ser. No. 11/837,227, filed on Aug. 10, 2007. The above-identified application is herein incorporated by reference in its entirety.

FIELD

The disclosed embodiments relate to a mobile communication terminal, such as a mobile or cellular telephone, or rather relates to control of appearance and colour of the mobile communication terminal.

BACKGROUND

In personal computers operating under Windows® or Apple® operating systems the user may change the wallpaper of the display into any desired colour or pattern and may in fact use a photograph as a wallpaper. Further, recent mobile telephones have been equipped with cameras so that a photograph taken by the mobile telephone may be used directly on the mobile telephone as a wallpaper.

Both in personal computers and in recent mobile telephones the wallpaper may be easily changed or altered. However, the colour scheme or pattern of the overall appearance of the mobile telephone is difficult to change (a differently coloured second physical cover may be required), which is time consuming and expensive.

International patent publication WO 2006/02491 discloses a communication terminal capable of receiving colour data from a photograph and generating a colour scheme for a user interface of said communication terminal based on the colour data. Light generating means are then adapted to receive said colour scheme and to provide a coloured light to the user interface in accordance with said colour scheme. However useful the solution according to international patent publication WO 2006/02491 is, it is still experienced a need for further developing convenient and attractive ways of altering the appearance of communication terminals.

SUMMARY

It would be advantageous to provide a mobile communication terminal having an overall appearance which easily is changed in accordance with any colour or pattern schemes.

A particular advantage of the disclosed embodiments is the provision of an appearance, which may be controlled by the mobile communication terminal in accordance with user preferences.

A further advantage of the disclosed embodiments is the provision of a way to easily make own personalized user interface graphics.

A particular feature of the disclosed embodiment relates to the utilization of a viewfinder, such as that of a camera, for enabling a user of the mobile communication terminal to search and capture visual information to generate a desired colour or pattern scheme. In particular, the disclosed embodiments relate to the utilization of a viewfinder presenting an image as detected by image acquiring components through the lens of a camera integrated with a cellular phone.

The above advantages and feature together with numerous other advantages and features, which will become evident from below detailed description, are obtained according to a first aspect of the disclosed embodiments by mobile communication terminal comprising a user interface, image acquirer and a processor, wherein said mobile communication terminal is adapted to receive real time acquired real time acquired colour data from said image acquirer, said processor is adapted to generate a colour scheme for said user interface based on said real time acquired colour data, and wherein light generating means are adapted to receive said colour scheme and to provide a coloured light to said user interface in accordance with said colour scheme.

In this context the term "mobile communication terminal" is to be construed as a mobile or cellular telephone, a personal digital assistant, or a laptop computer. The term "colour scheme" is in this context to be construed as a colour theme or colour shade plan, which may be digitally stored and generated.

Further in this context the term "user interface" may be construed as a display and image(s) that provides the user with control information and are displayed on the display, and as the display together with a cover, a light guide, and a keypad.

An advantage of the mobile communication terminal according to the first aspect of the disclosed embodiments is that the light generating means enable the operator of the terminal to control the colours of each of the elements of the mobile communication terminal. Hence the presentation or appearance of the mobile communication terminal may be matched to for example the operator's outfit or clothes.

The user of the mobile communication terminal may generate a photograph of the user's shirt, which photograph is then processed to generate a colour scheme for the terminal. The colour scheme may be generated to match the user's shirt. The colour scheme may comprise a colour pattern or a photograph, that is, the display of the terminal may present the photograph while the other elements of the terminal present colours matching the photograph.

A further advantage of the disclosed embodiments according to the first aspect is that the appearance of the mobile communication terminal may be changed continuously depending on what the image acquirer receives as input. The user interface is thus updated instantly, and there is no need for the user to take the long way round via for instance a stored image or snapshot.

Possible elements that might use this are for example selection frames, scroll bars, input elements, frames, dialog or some other are backgrounds, icons and any other UI elements. This can be used also as a visualization effect without any UI element, for example showing some reflections in the corners of frames or as a background of a title bar.

Hence, with the disclosed embodiments, it is enabled a real time view finder assisted reflection of a user interface appearance of a communication terminal.

In addition, the real time image acquiring feature may be left on, enabling continuously adaptive user interface in respect of the surrounding environment, like a chameleon.

In addition, according to the disclosed embodiments, it is also possible to use video or still image material. Visualizations can be rendered as animations or video sequences. For instance, motional material may be presented repeatedly or looped when visualized onto the surface of the user interface elements and material received from a plurality of still images may be animated and played back in a similar fashion.

The processor may further comprise or be in communication with a graphics accelerator. As an advantage, it enables rapid updating or refreshing of visualized data. The image acquirer may also be directly connected, or integrated with, a graphics processor, such as to enable even further advantages of rapid updating or refreshing of visualized data. Advantageously, the graphics accelerator is capable of rendering three dimensional (3D) graphics.

The light generating means according to the first aspect of the disclosed embodiments may comprise a light source having one or more multicoloured light diodes. In fact, the light source may have a plurality of sections of multicoloured light diodes adapted to be controlled by the processor. Alternatively or additionally, the light source may comprise a liquid crystal element or a series of liquid crystal elements adapted to be controlled by the processor.

The processor according to the first aspect of the disclosed embodiment may further be adapted to perform:
   (a) receiving real time acquired colour data from a real time acquired colour data generator;
   (b) indexing of colours of pixels of said real time acquired colour data and generating an array of indexed colours;
   (c) selecting a grouping parameter;
   (d) grouping of said indexed colours in accordance with said grouping parameter; and
   (e) allocating grouped colours to said user interface, keypad and cover of said mobile communication terminal.

By indexing the colours of the pixels of the photograph the processors may identify all colours of the photograph, and by grouping the indexed colours the processor may determine, which colours should be used for each element of the terminal, i.e. the display, keypad, or cover. This is particularly advantageous, since the display may present a photograph as a wallpaper, and the operational menus on the display are overlaying the wallpaper with colours in accordance with the colour grouping.

According to a further embodiment, the user interface may comprise user interface elements each having a surface onto which texture information can be mapped based on information from said colour scheme.

As an advantage, visual information captured by the real time image acquirer can be mapped onto the surfaces of the user interface (UI) elements in any possible way. Hence, visual information can be mapped as a texture to the UI elements surface according to any texture mapping method or for example be reflected to and/or from a reflective surface of the UI elements. Concurrent with the mapping of visual information to the user interfaces presented in a current view of the display, the remaining part of the display may continuously act as a view finder by presenting an image of the object in front of the camera. The view finder image may be presented in the background, with the user interface elements in the foreground, or as a miniature image in a certain location of the display, such as in any corner of the display or simply in a location where it does not interfere with any objects such as open windows, dialogue boxes, menu items or status indicators.

The mapping may involve rendering of vector graphics. As one advantage, efficient mapping of a reflection or a texture to the surface of a two or three dimensional user interface element.

The concurrent presentation of a view finder image and mapping of visual information onto user interface objects may be materialized in various ways, of which two examples will be given in the following. For instance, the view finder image may constitute a first layer on top of which a second layer comprising the image mapped interface elements. Alternatively, the mapped user interface elements are inserted into the same layer as the view finder image, and thus replacing the visual information of the view finder image in those areas which are replaced with the user interlace elements.

The texture of the UI elements may be colourless or exhibit a glass like, transparent appearance. The UI elements may further appear as three dimensional (3D) objects. Especially, the UI elements can render any kind of objects that can be mapped with texture. The surface of the UI elements onto which the texture can be projected may even appear smoke-like. The wording texture is in this context to be construed to comprise any visualization that can be mapped to the surface of an object, especially that of a UI element, and in particular in connection with presentation on a display of communication terminal.

In this regard, as well as in other aspects of the disclosed embodiments, it may be advantageous to have more than one image acquirer. For instance in the case where one is used to acquire image information, which is mapped to the UI elements, and another is used to acquire image information for the background image.

According to still yet a further embodiment, the mapping may be configurable such as to reflect a customized appearance of said texture.

As an advantage, sophisticated user actions may be added, enabling a user for instance to choose exactly how the mapping is to be implemented to reflect certain characteristics of the texture of the user interface elements. For instance, a user is enabled to select where or how to map that to the elements, or even to specify rotation of the texture around an element. Alternatively, the process is administered automatically, such that the only input needed from the user is to find the right view in the view finder, while at the same time seeing how the UI looks.

The above advantages and features together with numerous other advantages and features, which will become evident from below detailed description, are obtained according to a second aspect of the disclosed embodiments by a method for generating a colour scheme for a mobile communication device comprising:
   (a) receiving real time acquired colour data from a real time acquired colour data generator;
   (b) indexing of colours of pixels of said real time acquired colour data and generating an array of indexed colours;
   (c) selecting a grouping parameter;
   (d) grouping of said indexed colours in accordance with said grouping parameter; and
   (e) allocating grouped colours to a user interface, keypad and cover of said mobile communication terminal.

The real time acquired colour data according to the second aspect may a photograph, a drawing, or any combination thereof. The real time acquired colour data may be taken directly as a snapshot by the camera of the mobile communication terminal or be downloaded from a communication network. Alternatively, the real time acquired colour data may be a piece of art generated or downloaded to the mobile communication terminal by the user.

The grouping parameter according to the second aspect of the disclosed embodiments may comprise one or more elements establishing design criterion for the colour scheme. The grouping parameter may be selected by the user of the mobile communication terminal or may be a default value stored in the mobile communication terminal, or in fact, a combination thereof.

The colour scheme according to the second aspect of the disclosed embodiments may comprise an overall plan for combining of colours and patterns that are to be applied to the display, keypad and cover of the mobile communication terminal. The colour scheme advantageously establishes a set of rules to be followed during the establishing a desired appearance of the mobile communication terminal.

The method according to the second aspect of the disclosed embodiments may further comprise checking colour scheme output and feed back of an adjusted grouping parameter. The method thereby advantageously allows the mobile communication terminal for continuously make sure that the colour scheme utilized provides a visible user interface.

The above objects, advantages and features together with numerous other objects, advantages and features, which will become evident from below detailed description, are obtained according to a third aspect of the disclosed embodiments by a computer program product such as a computer-readable medium having computer-executable components comprising instructions for receiving real time acquired colour data from a real time acquiring colour data generator;
 (a) indexing of colours of pixels of said real time acquired colour data and generating an array of indexed colours;
 (b) selecting a grouping parameter;
 (c) grouping of said indexed colours in accordance with said grouping parameter; and
allocating grouped colours to a user interface of said mobile communication terminal.

The computer program product may further be adapted to perform any of the previously disclosed methods when run on a mobile communication terminal according to any of the previously disclosed embodiments.

BRIEF DESCRIPTION OF THE DRAWINGS

The above, as well as additional features and advantages of the disclosed embodiments, will be better understood through the following illustrative and non-limiting detailed description of preferred embodiments with reference to the appended drawings, wherein.

DETAILED DESCRIPTION OF PREFERRED EMBODIMENTS in the following description of the various embodiments, reference is made to the accompanying drawings, which show by way of illustration various embodiments, in which the invention may be practiced. It is to be understood that other embodiments may be utilized, and structural and functional modifications may be made without departing from the scope of the disclosed embodiments.

Figure 1:
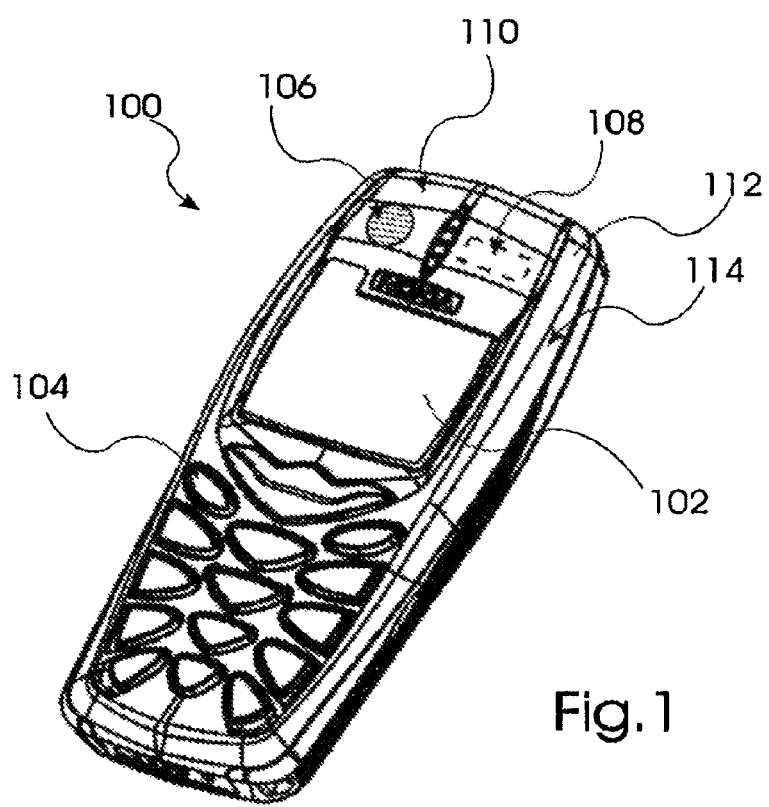
FIG. 1, shows a mobile communication terminal according to a first embodiment.

FIG. 1 shows a mobile communication terminal designated in entirety by reference numeral 100. The mobile communication terminal 100 comprises a display 102 and a keypad 104 enabling the user of the mobile communication terminal 100 to interface with the mobile communication terminal 100. The mobile communication terminal 100 further comprises a camera 106 for taking of photographs, which may be presented on the display 102 in accordance with the user's instructions. The camera 106 is shown in FIG. 1 positioned on the front side of the mobile communication terminal 100 entirely for simplicity reasons, the camera 106 may appropriately be positioned on any surface of the mobile communication terminal 100. In particular, the camera 106 may advantageously be positioned on the rear surface of the mobile communication terminal 100, so that the user may concurrently see in the display 102 what is targeted in the camera view.

The mobile communication terminal 100 further internally comprises a colour controlling device 108, which enables the user to control the colour and thereby appearance of the mobile communication terminal 100. For example, the user may take a photograph and apply this photograph as a wallpaper on the display 102 and further instruct the colour controlling device 108 to generate a colour scheme, which is implemented in the display 102, in the keypad 104 and in selected cover parts 110, such as for example the edge 112 of the cover 114.

Figure 2:
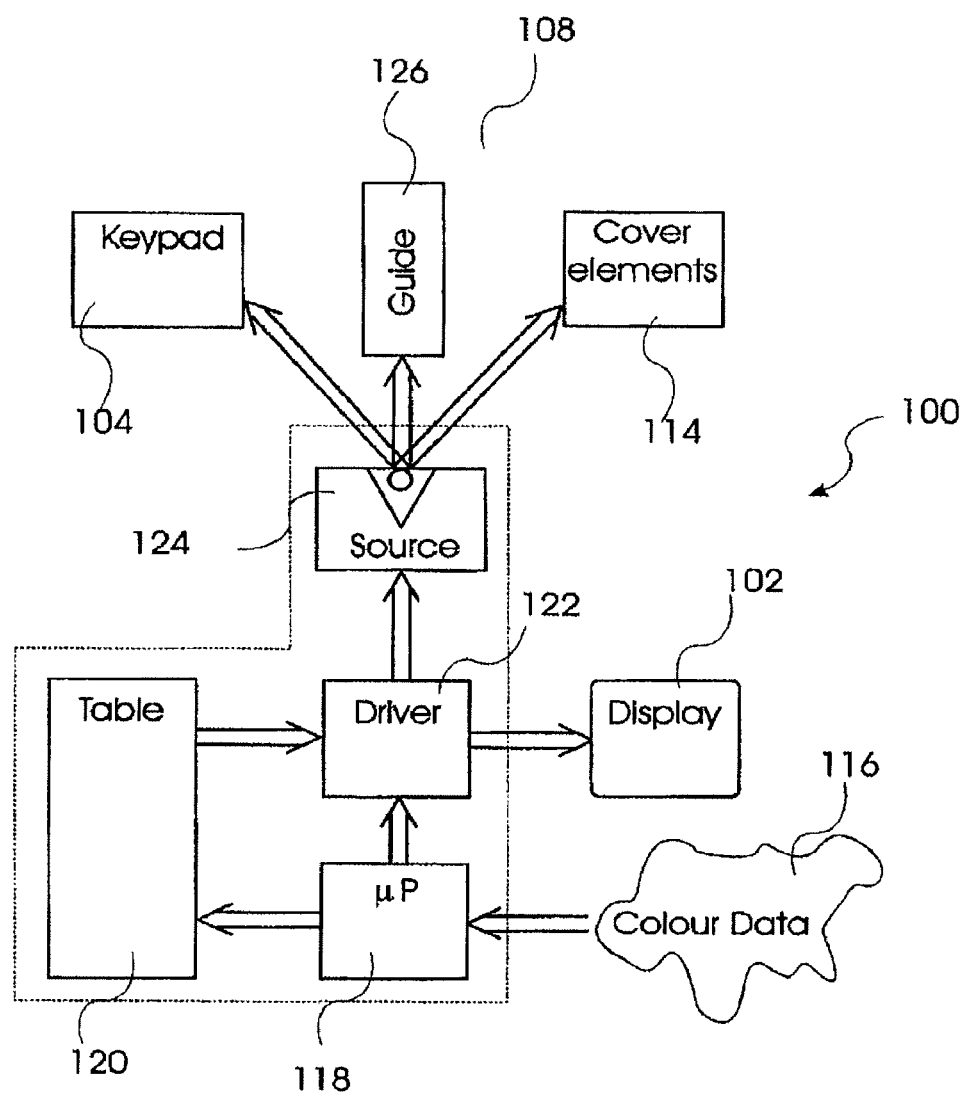
FIG. 2, shows a block diagram of a mobile communication terminal according to a first embodiment.

FIG. 2 shows a block diagram of the mobile communication terminal 100 described above. Further, FIG. 2 shows in detail the colour controlling device 108 communicating with the display 102, the keypad 104, and the cover 114.

The colour controlling device 108 receives real time acquired colour data 116, for example a photograph or video stream received from the camera 106 or downloaded from a communication network. The user of the mobile communication terminal 100 may use the camera 106 for panning over an area thereby generating a video sequence on the display 102 and at any point press a key on the keypad 104 so as to freeze the camera view as a photograph. This photograph may then be used for generating a colour scheme for the mobile communication terminal 100.

The colour controlling device 108 comprises a processor 118, such as a microprocessor or a micro-controller, which is adapted to receive the acquired colour data 116. The processor 118 indexes the real time acquired colour data 116 in an array of colours, which are detected in the real time acquired colour data 116. For example, if the real time acquired colour data is a photograph having 256 colours an index array of 16 by 16 is generated. Obviously, the photograph and the real time acquired colour data 116 as such may have any number of colours, such as in the range between 3 to 1024.

The term "colour" should in this context include any scale of grey. That is, the real time acquired colour data 116 may be a grey scaled photograph.

The processor 118 groups the colours of the index array in accordance with a selected design criterion. The processor 118 uses the grouped colours for generating a colour scheme to be loaded in to table 120. The table 120 may be implemented as any ordinary random access memory. The colour scheme describes allowable combinations of colours, i.e. which colours may be used in combination with the real time acquired colour data 116. For example, the photograph may show a steel grey building, and therefore one design criterion may be to allow colours in the grey scale to be used for menus overwriting the photograph when used as wallpaper on the display 102. Obviously, the design criterion may include physiological parameters, which define the most visible colour combinations.

The processor 118 forwards a control signal to a device driver 122 for controlling colours of the display 102 and a light source 124. The display 102 and the light source 124 are driven by the device driver 122 in accordance with the colour scheme generated by the processor 118.

The light source 124 may comprise one or more multi-coloured light emitting diodes (LED) and/or liquid crystal panels. The light generated by the light source 124 is communicated to the keypad 104 and selected cover parts of the cover 114. The light is shown in FIG. 2 as further communicated to a light guide 126. One or more LEDs may be positioned appropriately under the keypad 104 and under opaque parts of the cover 114.

Figure 3:
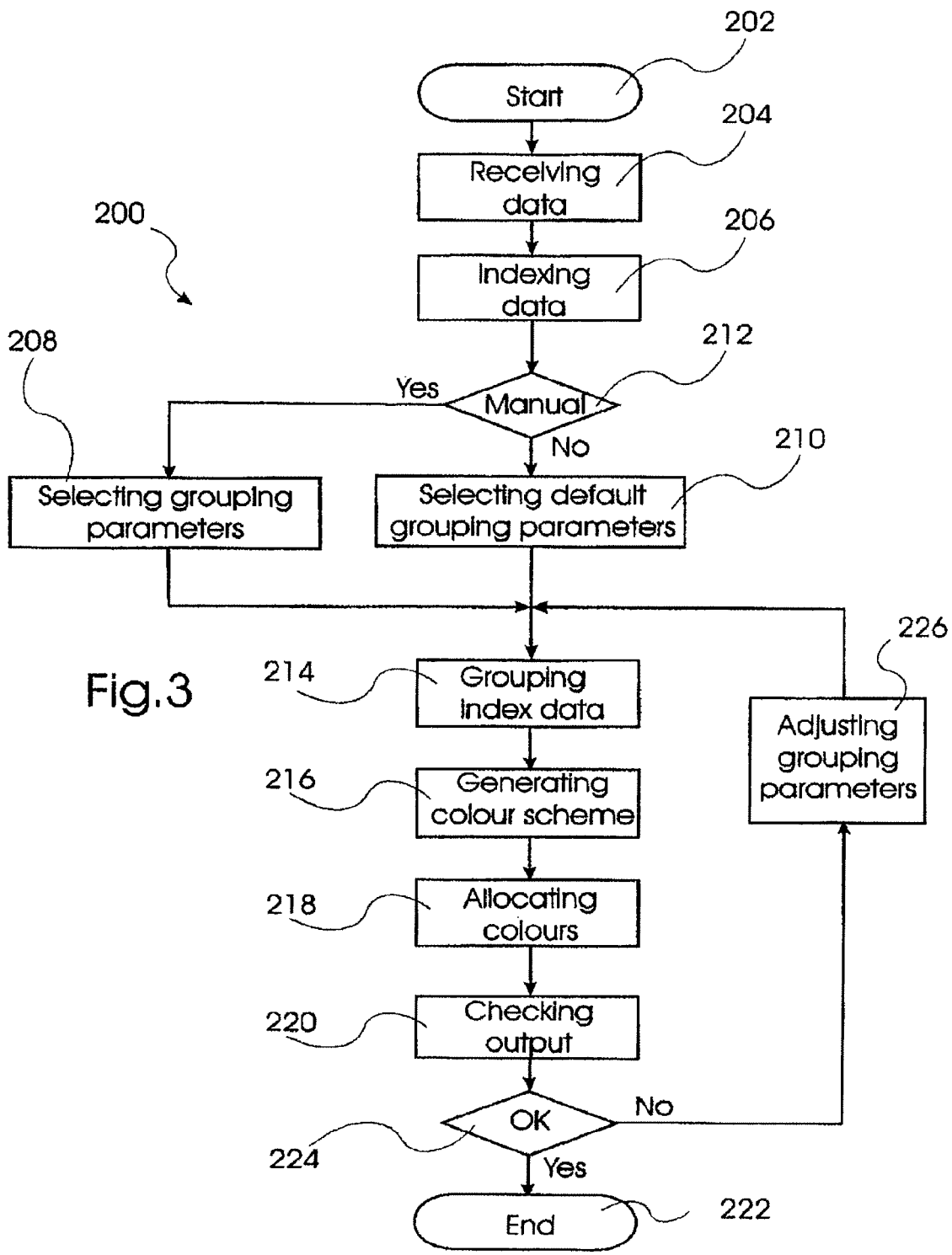
FIG. 3, shows a flow chart of a process utilised by a mobile communication terminal according to the first embodiment.

FIG. 3 shows a flow chart of a method 200 to be performed by the processor 118. The method 200 may be implemented as a computer program to be run by the processor 118 in the mobile communication terminal 100.

The method 200 initiates in step 202, during which variables are initialized and constants recorded. Subsequently the processor 118 is ready for receiving real time acquired colour data 116 during step 204. The real time acquired colour data 116 are indexed in an array as described above during step 206. The colours of the array are to be grouped according to a design criterion established by grouping parameters. The grouping parameters are either manually (step 208) or automatically (step 210) selected. That is, the mobile communication terminal 100 enables the user to select amongst a wide varieties of design criterions, such as psychedelic, metallic or soft tone. The mobile communication terminal 100 further enables the user to download design criterions from the communication network.

The user of the mobile communication terminal 100 responds to the processor 118, whether the grouping parameters are to be manually or automatically selected during step 212. The mobile communication terminal 100 enables the user to pre-set responses to be given in step 212, so that no user involvement is required during the method 200.

The indexed colours are grouped together in accordance with the grouping parameters during step 214 and, subsequently, a colour scheme is generated.

During step 218 the colours in the colour scheme are allocated to menus to be presented in the display 102, to parts of the cover 114, and/or to the keypad 104.

In order to ensure, in particular, that the menus are visible to a user in the display 102, the colour scheme output, i.e. the menus overlaying a wallpaper in the display 102 and the colours of the keypad 104 and cover 114, is checked during step 220. If the colour scheme output is okay the method 200 terminates during step 222. If on the other hand the colour scheme output is not okay, which is resolved during step 224, the grouping parameters are adjusted during step 226 and fed back to the grouping step 214.

Figure 4:
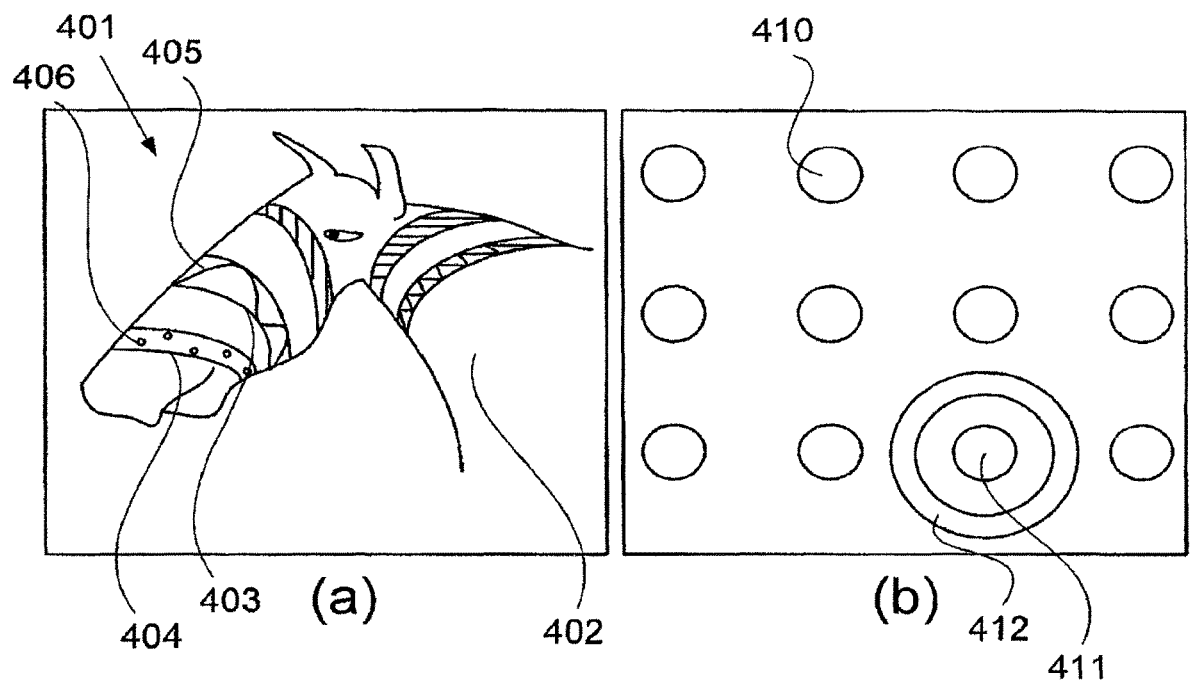
FIGS. 4(a)-4(c) illustrate a view of an image, a user interface with interface items, and a composite view rendered with the image in the background, according to an embodiment.
Figure 4:
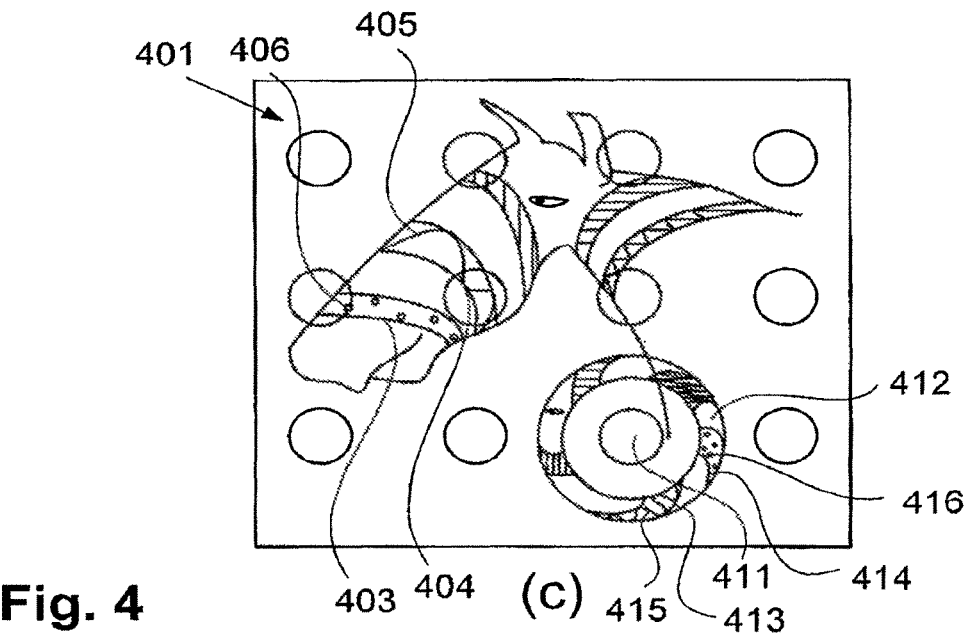

FIGS. 4a-4c shows the display of a communication terminal according to one embodiment. FIG. 4a illustrates a view finder image of an object, in this case a horse 402, which is captured by an image acquiring unit of the communication terminal. It is furthermore indicated a first 403 and a second 404 region comprising a first and second texture content respectively. The texture content are illustrated with a curved line 405 and dots 406 respectively. FIG. 4b illustrates a user interface in which symbols 410 and 411 arranged in a grid structure represent user interface items available for selection by a selection frame 412. The user item 411 is here shown to be ready for selection, indicated by the framing of selection frame 412. FIG. 4c illustrates a composite view where the view finder image 401 is in the background of the grid structure comprising the user interface symbols 410 and 411. FIG. 4c it is furthermore illustrated how texture from the view finder image is mapped and rendered onto the surface of a user interface item, in this case the selection frame 412. The texture mapping is illustrated by the curved line 415 in a first mapped region 413 and the dots 416 in a second mapped region 414 originating from the corresponding view finder view 401 of a curved line 405 and dots 406 respectively. For printing quality reasons, the user interface elements or items are presented as plain encircled areas, although various of other alternatives are possible. It is possible to render mapping of textures onto the surface of in principle any kind of object, two dimensional or three dimensional. The user interface elements may comprise menu items, scroll bars, dialogue prompts, frames etc.

For further understanding of the disclosed embodiments, a few additional examples will be given in the following.

EXAMPLE 1

A user executes a UI visualization mode, whereupon a view finder appears as a background image on the display. User interface elements visible in the present view of the display instantly changes appearance to reflect the colours and texture of the view finder image. As the user points the communication terminal in various directions, the appearance of the UI elements changes continuously to reflect the current image of the view finder. At any time, the user may, for instance by pressing a key of the communication terminal, select an appearance or visualization that he or she likes.

EXAMPLE 2

A user wants to create a red appearance of the user interface. The user points the camera of the communication terminal towards a red brickstone building and sees through the view finder an image of the building. Upon selection of a function, the user interface instantly changes to a colour tone which reflects that of the building quite nicely. Items of the user interface appear with variable red shades with shadows. Happy with the result, the user stores the scheme and also sends it attached to a message to a friend.

EXAMPLE 3

A user is looking at a continuously updated view finder of a presentation of a beautiful sunrise as captured with a camera of a communication terminal. With software included in the communication terminal to give additional functionality and manipulating capabilities to the visually adaptive user interface, the user experiments to manipulate the visually adaptive user interface to render the user interface as invisible as possible, but visible enough to make use of the user interface possible. Upon configuration of a few parameters, the user reaches an appearance of the user interface that looks nice and wants to store that.

Hence, in other words, a camera of a communication terminal is used as an user interface theme search and capture lens. User interface element(s) receive texture from objects appearing in a view finder view. The mapping of colours and/or texture can be done automatically or upon receipt of user input in connection with selection of user selectable functions.

The UI visualization may change all the time, depending on what the camera sees. It is also possible to save the visualizations and use them later in any situation. One possibility is to make combinations of user interface element visualizations generated in separate sessions. These textures can be also be retrieved from other people who have made them.

The invention claimed is:

1. A method for mapping texture content to user interface elements for a mobile communication device comprising:
   receiving a real time acquired image comprising at least one texture content, the real time image being continuously captured in real time via a camera of the mobile communication device;
   generating a colour scheme and identifying the at least one texture content from said real time acquired image;
   displaying in a user interface a composite view comprising the real time image, a plurality of user interface elements and a selection frame illustrating the at least one texture content;
   continuously applying, in real time, the at least one texture content and the colour scheme onto at least one of the plurality of user interface elements in the user interface to reflect the real time acquired image;
   setting the at least one texture content onto at least one of the plurality of user interface elements upon receipt of user input of selection from the selection frame; and
   setting the colour scheme onto at least another one of the plurality of user interface elements upon receipt of user input of selection of the at least another one of the plurality of user interface elements.

2. The method according to claim 1, wherein said user interface comprises a display.

3. The method according to claim 2, wherein said user interface further comprises a cover, a light guide, and a keypad.

4. The method according to claim 1, wherein displaying said real time acquired image as a background image and rendering the color scheme and the at least one texture content onto the at least one of the plurality of user interface elements are shown on the user interface concurrently.

5. A mobile communication terminal comprising;
   a user interface;
   an image acquirer; and
   a processor configured to control the mobile communication terminal to:
   continuously receive a real time acquired image comprising at least one texture content from the image acquirer,
   generate a colour scheme and identify the at least one texture content from said real time acquired image,
   display in a user interface a composite view comprising the real time image, a plurality of user interface elements and a selection frame illustrating the at least one texture content;
   continuously apply, in real time, the at least one texture content and the colour scheme onto at least one of the plurality of user interface elements in the user interface to reflect the real time acquired image,
   set the at least one texture content onto at least one of the plurality of user interface elements upon receipt of user input of selection from the selection frame, and
   set the colour scheme onto at least another one of the plurality of user interface elements upon receipt of user input of selection of the at least another one of the plurality of user interface elements.

6. The mobile communication terminal of claim 5, wherein said user interface comprises a display.

7. The mobile communication terminal of claim 6, wherein said user interface further comprises a cover, a light guide, and a keypad.

8. The mobile communication terminal of claim 5, wherein displaying said real time acquired image as a background image and rendering the color scheme and the at least one texture content onto the at least one of the plurality of user interface elements are shown on the user interface concurrently.

9. A computer program product comprising a non-transitory computer-readable medium having computer-executable components comprising instructions for:
   receiving a real time acquired image comprising at least one texture content, the real time image being continuously captured in real time via a camera of the mobile communication device;
   generating a colour scheme and identifying the at least one texture content from said real time acquired image;
   displaying in a user interface a composite view comprising the real time image, a plurality of user interface elements and a selection frame illustrating the at least one texture content;
   continuously applying, in real time, the at least one texture content and the colour scheme onto at least one of the plurality of user interface elements in the user interface to reflect the real time acquired image;
   setting the at least one texture content onto at least one of the plurality of user interface elements upon receipt of user input of selection; and
   setting the colour scheme onto at least another one of the plurality of user interface elements upon receipt of user input of selection of the at least another one of the plurality of user interface elements.

10. The computer program product of claim 9, wherein said user interface comprises a display.

11. The computer program product of claim 10, wherein said user interface further comprises a cover, a light guide, and a keypad.

12. The computer program product of claim 9, wherein displaying said real time acquired image as a background image and rendering the color scheme and the at least one texture content onto the at least one of the plurality of user interface elements are shown on the user interface concurrently.

* * * * *